United States Patent [19]

Hayes, Jr.

[11] 4,264,437

[45] Apr. 28, 1981

[54] METHOD AND APPARATUS FOR PRESSURE SCREENING FIBROUS SUSPENSIONS

[76] Inventor: Millard F. Hayes, Jr., P.O. Box 294, (Hudson St.), Warrensburg, N.Y. 12885

[21] Appl. No.: 76,685

[22] Filed: Sep. 19, 1979

[51] Int. Cl.$^3$ .............................................. B07B 1/20
[52] U.S. Cl. .................................. 209/273; 209/380
[58] Field of Search ..................... 209/273, 30 J, 306, 209/380, 385, 389

[56] References Cited

U.S. PATENT DOCUMENTS

| | | | |
|---|---|---|---|
| 3,814,244 | 6/1974 | Young | 209/273 |
| 4,067,800 | 1/1978 | Young | 209/273 |

*Primary Examiner*—William A. Cuchlinski, Jr.
*Attorney, Agent, or Firm*—Ross, Ross & Flavin

[57] ABSTRACT

A screening apparatus for screening fibrous material in liquid suspension includes a housing having an inlet and accept fraction outlet and reject fraction outlet. The suspension is introduced under pressure via the inlet. A cylindrical screen is positioned centrally within the housing to define an involute reject passage within the housing and outboard of the screen with the rejected fraction passing under pressure from the reject passage outwardly of the housing via the rejected fraction outlet. The accepted fraction passes from the reject passage inwardly through the screen and is then passaged under pressure outwardly of the housing via the accepted fraction outlet. The suspension is under pressure in its travel through the apparatus and is pulsed en route by a plurality of elastically mounted diaphragms driven in compressing and decompressing strokes by means eccentrically mounted on a rotating mainshaft.

5 Claims, 5 Drawing Figures

METHOD AND APPARATUS FOR PRESSURE SCREENING FIBROUS SUSPENSIONS

The present invention is concerned with the method of and apparatus for screening fibrous suspensions and more particularly relates to a screening under pressure using vibratory pulsators of a kind in which elastically mounted diaphragms reciprocate toward and away from a screen which is wholly or partly immersed in a fibrous suspension in a gutter or trough. An eccentric rotary shaft mounts a plurality of connecting rods, said shaft being rotative in a direction coinciding with the direction of flow of the fibrous suspension in the gutter or trough.

PRIOR ART

Screens found in mills today are classified as flat screens, rotary screens, centrifugal screens, or pressure screens.

With few exceptions, flat screens are open, gravity flow screens. The unscreened material is fed at one end onto the top of the screen plate with the accepts flowing through the screen plate openings and the rejected material being washed, scraped, or conveyed to the other end for removal.

Low-frequency vibrating screens that employ a vibrating diaphragm to pump accepted stock back through the screen plates (to prevent plugging) were practically the only type of screens used in the paper industry for many years. There are still a number of them in use, but they are gradually being replaced by more modern screens.

The more modern high-frequency vibrating screens rotate the screen plate in a controlled level pond for cleaning the plate and conveying the rejects to a dry, elevated discharge point at the end.

Most of these screens are used with round holes in the screen plates, although some slotted plates are used. Their primary use is as a coarse pre-screen ahead of fine screens or as a tailing screen to concentrate and remove debris rejected from fine screens. Good fiber may thus be reclaimed.

Rotary screens are also generally open, gravity flow screens. Also, like flat screens, they are built in both low-frequency and high-frequency types. The low-frequency types are used to some extent in pulp mills, but are primarily used as a paper machine screens. High-frequency types are used primarily in deink systems and pulp mills, due to their ability to screen with fine slots at relatively high consistency. Rotary screens are rapidly being replaced, due to their high maintenance costs and the availability of improved cleaning equipment today.

Centrifugal screens are generally totally enclosed, non-pressurized units. The screen plate, which is formed into a cylinder and has round holes, is arranged in a horizontal position. Feed material is fed into the cylinder at one end and accepted stock is forced through the screen plate by the centrifugal force imported by the rotating element. Material which is forced to travel axially to the other end of the cylinder is rejected through a fixed opening.

Pressure screens generally utilize a screen plate in the form of a cylinder. Feed material is fed into the inside or outside of the cylinder with acceptable stock being forced through the screen plate by pressure. The main difference in the units is in the rotating elements that are designed to keep the screen plate from plugging or matting over with fiber. There are now screen plates and screens designed to use either round holes or slots, depending on the type of debris in the feed.

The advantages of pressure screens are a high capacity per unit, a totally enclosed pressurized cleaning system that excludes mill debris and minimizes slime build up, flexibility of physical location, small space requirements, and a minimum of piping and pumping.

SUMMARY OF THE INVENTION

The theoretical measure of a pulp or paper mill screen's success is its efficiency in removal of contaminate material. In actual practice, this must be closely coupled to its ability to survive upsets in consistencies, flow rates or quality of cooking without plugging. In both departments, the apparatus hereof has performed very well indeed.

The reason for the design of a truly pressurized pulp screen was primarily due to the mediocre success attained in pulp mill applications of various modified design paper machine pressure screens. The desirability of a fully pressurized screen is recognized clearly in that it affords complete system flexibility in new and old mills alike, allowing its installation at any elevation with respect to other process equipment and for direct control of rejects rates. The ability to install the screen at a floor above or below the stock washer saves critical space on the washer operating floor and means simpler and less expensive piping and improved houskeeping conditions.

The screen exploits the fully pressurized concept and offers efficiencies necessary in pulp mill operations coupled with operational reliability, mechanical simplicity and ruggedness of design.

The basic design hereof represents a radical departure from paper machine pressure screen designs, which invariably depend on the comparatively slowly rotating hydrofoils, which produce a much lower frequency and intensity of pulses to keep the screen cylinders clean.

The invention has special relation to screening apparatus embodying a vertically extending cylindrical screen having respective inner and outer passageways spaced radially apart for receiving materials of desired consistency and delivering the same to respective outlets of the screening apparatus as rejected or accepted fractions.

It is a primary object of the invention to provide a screening apparatus which will effectively and efficiently screen fibrous material suspended in liquid and which is particularly useful in screening paper stock of dirt particles, bark, slivers and other undesirable material.

Another object is to provide a screening apparatus for separating fibrous material and delivering the desired constituent at an accepted fraction outlet and for delivering undesired constituents of material of different characteristics to a different rejected fraction outlet.

The structural aspect is a screening apparatus for screening fibrous material in a liquid suspension and includes a housing having an inlet and an accepted fraction outlet and a rejected fraction outlet. The suspension is introduced under pressure via the inlet. A cylindrical screen, positioned centrally within the housing, defines an involute reject passage within the housing and outboard of the screen with the rejected fraction passing under pressure from the reject passage outwardly of the housing via the rejected fraction outlet. The accepted fraction passes from the reject passage inwardly through the screen and is then passaged outwardly of the housing via the accepted fraction outlet. The suspension is under pressure in its travel through the screen and is pulsed en route by a plurality of elastically mounted diaphragms driven in compressing and decompressing strokes by means eccentrically mounted on a rotating mainshaft.

The method aspect of the invention is aided by the use of connecting rods which cause the diaphragms to pulsate so as to generate pressures on the flow of stock both on the outside and on the inside of the screen. A backwash effect is obtained as produced on the one hand by the propelling force of the suspension being forced into the apparatus and charged into the enclosed passage defined by the housing circularly around the screen exterior on the one hand with screened portions thereof being directed inwardly through the provided slots of the screen to the screen interior, and on the other hand by the propelling force of the pulsators disposed interiorly of the screen which augment the existing pressurization of the stock by forcing same in opposite direction toward the screen so as to attain a screen cleansing effect.

The essential characteristic of the new apparatus lies in the fact that the vibratory forces, generated upon rotation of the eccentric shaft, are caused to be transferred to the screen in the manner of a backwash filter in that the stock is either forced inwardly through the screen as the accepted fraction or forced outwardly away from the screen as the nonaccepted fraction.

Prior art devices are known incorporating foils which are rotated circularly past a stationary screen so as to create a trailing vacuum.

The apparatus hereof offers a positive impulse as contrasted with the prior art dependence upon a trailing vacuum from a foil.

A single stage pressure type screening device is selective in long fiber removal action and in the concentration of rejects in a wide range of unscreened paper stock inlet flow and reject flow. Because of its simplicity of design, ease of maintenance and satisfactory screen life, the mechanical downtime of such a single stage pressure type screening device is almost negligible. The single stage pressure type screening device has the advantage of operating at pressures above atmospheric pressure so that the accepted screened stock coming out of the device is under pressure and, therefore, can be directed by a closed piping system to the next apparatus in the papermaking arrangement.

Since the unscreened stock inlet to the single stage pressure type screening device is also under pressure, the screening device, together with its inlet and outlet piping, is completely enclosed, thus eliminating the disadvantages of prior art screening devices (i.e., directing the paper stock in open troughs with the consequent disadvantages of splashing, etc.) and of accumulating undesirable dirt and foreign material in so doing.

Another object of the invention is to provide an improved pressure type screening device which maintains the paper or pulp stock in a homogeneous condition (i.e. uniform fiber density) and a more uniform fiber particle formation per unit of volume.

Yet another object of the invention is the provision of an improved pressure type screening device with improved screen cleaning characteristics and resultant higher production output of screened paper stock.

Other objects and added features and advantages will become manifest to those versed in the art upon making reference to the description and drawings which follow in which an embodiment of this invention is shown by way of illustrative example. The apparatus exemplifies one way of carrying the invention into effect, the invention being, however, by no means restricted to this embodiment, for instance, the transfer of the vibratory forces from the rotating shaft to the diaphragms may be otherwise achieved.

Figure 1:
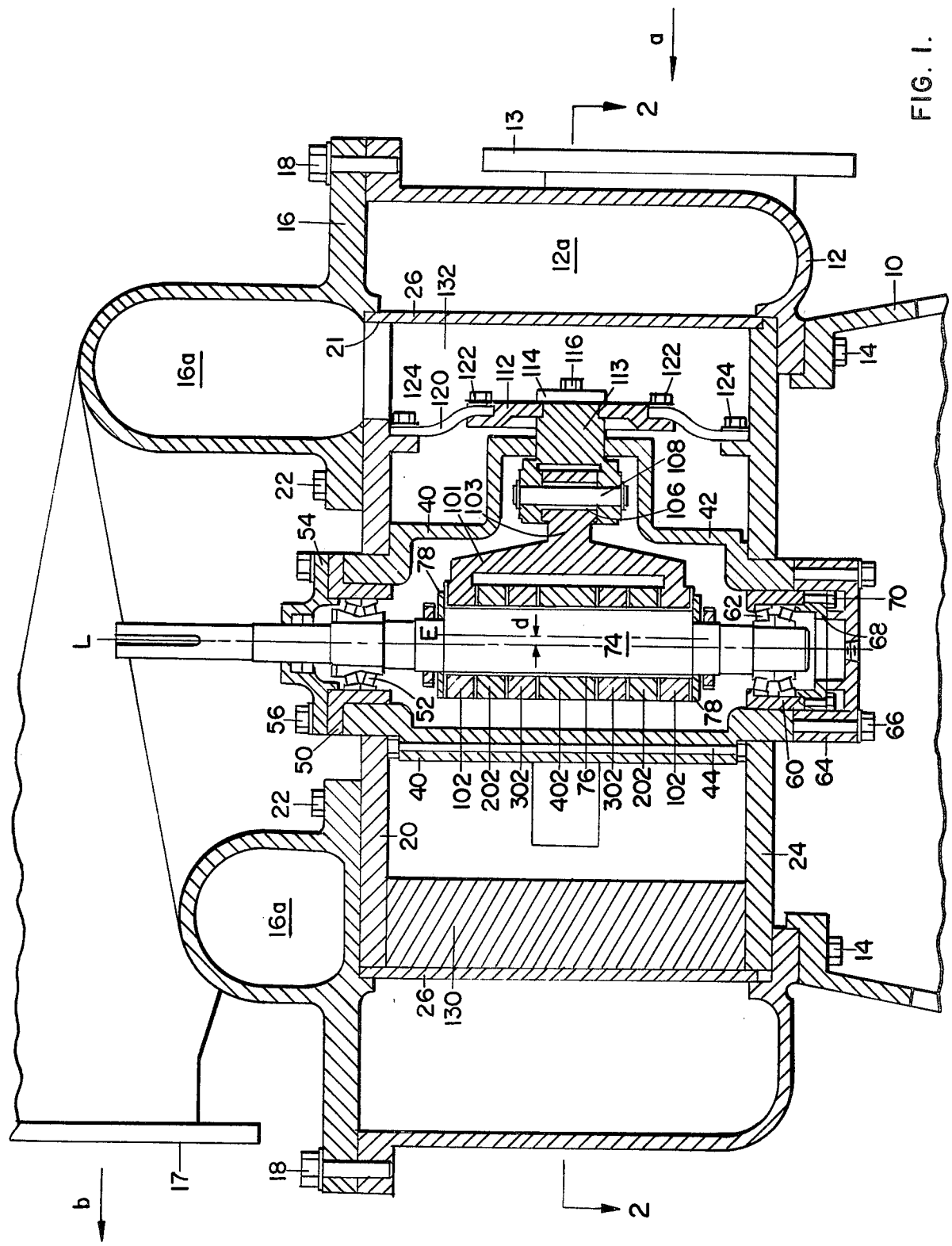
FIG. 1 shows a longitudinal sectional view of the screening device on the line 1—1 of FIG. 2.
Figure 2:
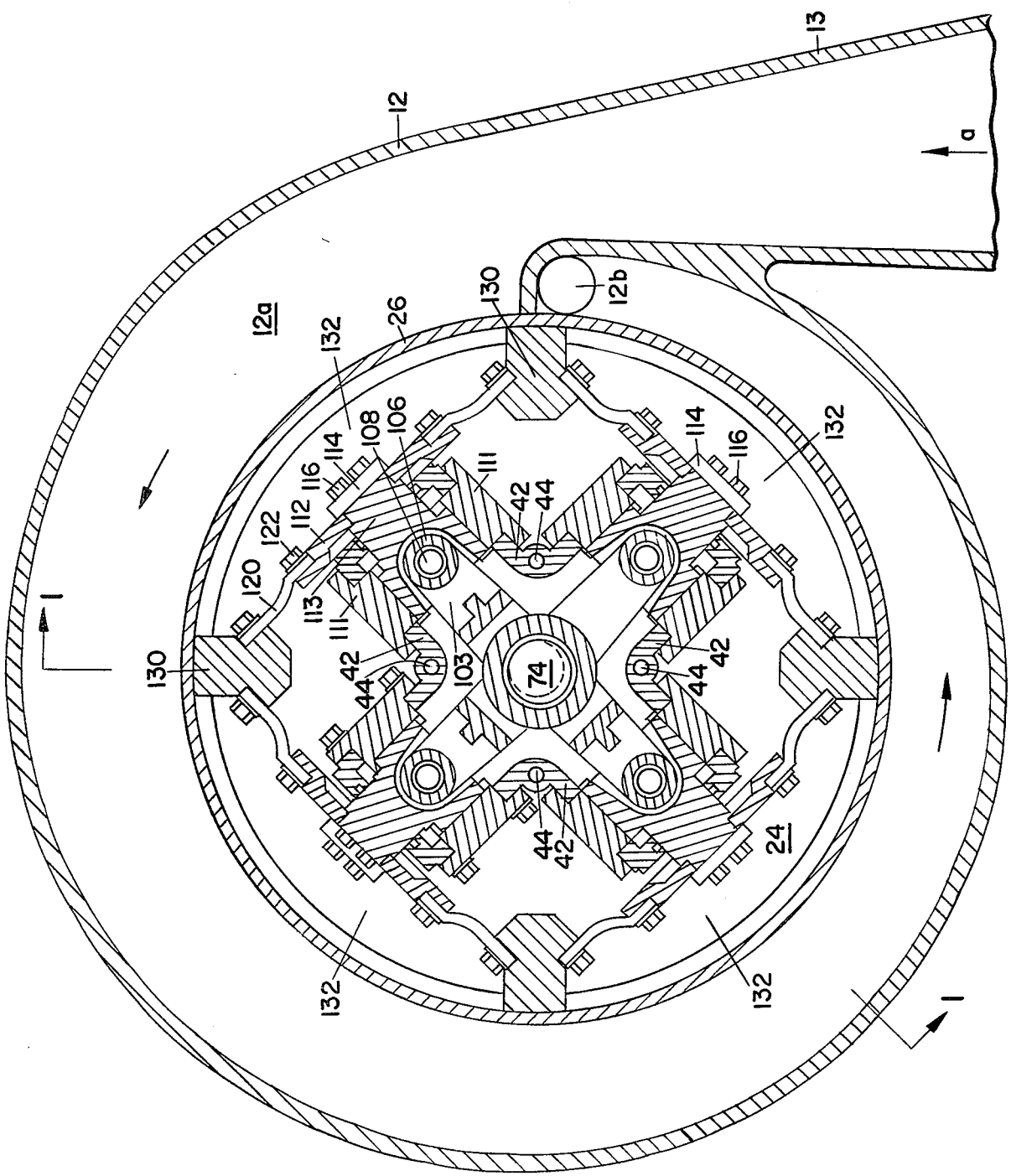
FIG. 2 shows the screening device in cross section on the line 2—2 of FIG. 1.
Figure 3:
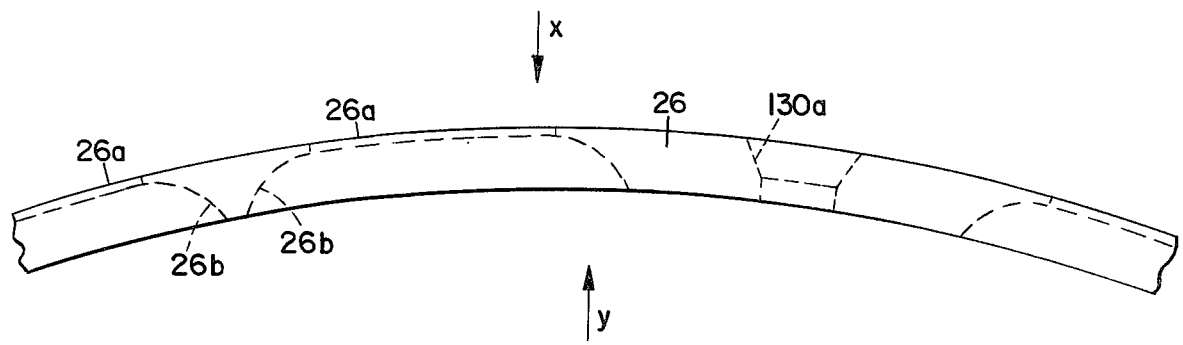
FIG. 3 is an enlarged fragmentary top plan view of the screen plate or basket.
Figure 4:
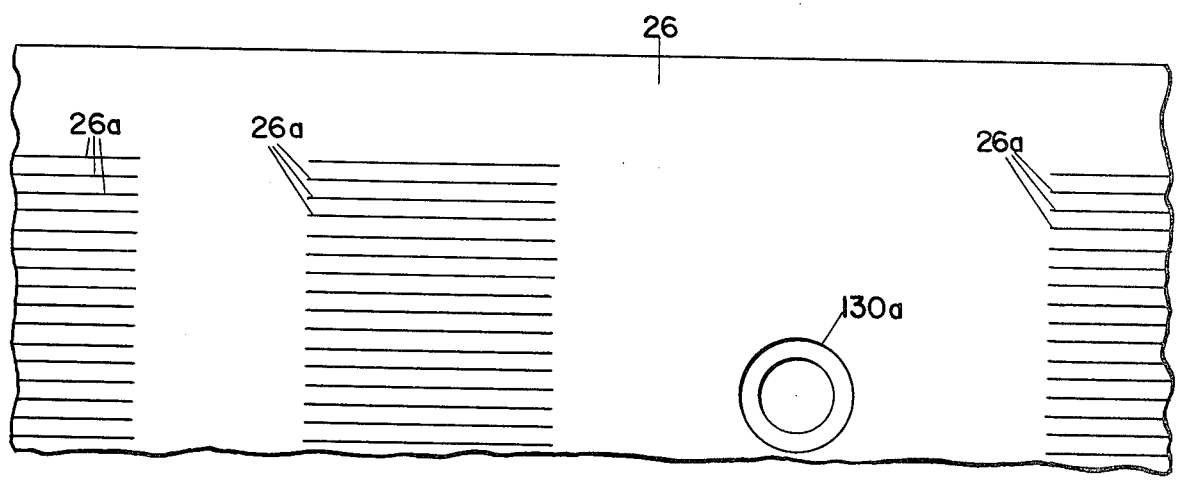
FIG. 4 is an enlarged fragmentary view of the screen plate or basket of FIG. 3 as viewed from the exterior thereof, that is looking in the direction denoted by arrow x.
Figure 5:
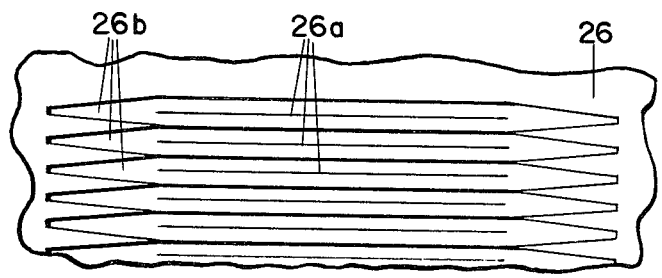
FIG. 5 is an enlarged fragmentary view of a portion of the screen plate or basket of FIG. 5 as viewed from the interior thereof, that is looking in the direction denoted by arrow y.

The exemplified device comprises a circular base 10 for upwardly supporting a circular screen body inlet 12, same being nestably receivable on the base and secured thereto as by suitably-spaced strategically-positioned cap screws 14.

Inlet 12 communicates at one side thereof with flanged entranceway 13 by which a supply of fibrous material suspended in liquid such as paper stock to be screened is delivered to the apparatus, flowing thereinto in the direction of arrow a.

Around the upper periphery of screen body inlet 12 is seated an annular top outlet 16, being secured to the inlet as by a plurality of peripherally spaced cap screws 18.

Top outlet 16 is in direct communication at one side thereof with flanged exit 17 by which the accepted fraction of screened stock exits the apparatus, flowing therefrom in the direction of arrow b.

The inner periphery of top outlet 16 is secured to an annular screen basket top 20 as by a plurality of spaced cap screws 22.

At the lower inside periphery of screen body inlet 12, an annular screen basket bottom 24 is secured as by the cap screws 14.

Outboard of screen basket top and bottom 20 and 24 respectively and clamped thereby relative to screen body inlet 12 and top outlet 16 is a vertically-extending cylindrical screen plate or basket 26 through which the incoming stock is screened, the accepted fraction passing through the screen and the nonaccepted fraction not passing therethrough.

Screen plate or basket 26 is strategically spaced inboard of and in general parallelism with the outermost vertically extending portion of screen body inlet 12 so as to define therebetween an involute passage 12a, which is identified as the rejected fraction passage.

The screen 26 is provided with spaced series of vertically-arranged slots or long narrow cuts or openings through the screen as viewed from the screen exterior, such slotting being preferred to ensure that only separated or individualized long fibers of the suspension will pass therethrough.

At the opposite, interior side of the screen, the elongated narrow slots 26a are each merged into a respective enlarged chambered groove 26b so as to facilitate stock passage through the screen once successfully through the initial slotting 26a.

Suitable bolt holes 130a are provided for the securement of the screen to the provided posts 130, subsequently to be referred to.

The size and shape of the screen openings will depend to a large extent on the size and shape of the major portion of the debris to be removed.

In most screens, there is a certain amount of positive separation of debris. This is accomplished because the debris is of such a size that it cannot possibly get through the openings. This factor has to be considered when choosing the type of screen and the type of opening to be used.

Slots are preferred to round holes for the reason that they are more effective in removing long, thin shives and their flat particles as the shives and flat material tend to line with the slots rather than across them thus allowing their passage through the slots.

Centrally of screen basket top and bottom 20 and 24 respectively in vertically aligned central openings therethrough are disposed an upper and lower half housing 40 and 42 respectively.

Each half housing is divided into four quadrants in right angular disposition as to each other, the two half housings being disposed vertically in opposite directions and brought into confrontation with each other and held thereat in liquid sealed relationship by means of housing bolts 44, each such bolt being extendable vertically through the half housings at one of the junctions of adjacent quadrants, as best shown in FIG. 1.

Housing nuts 46 are threadedly engaged on the opposite ends of each of the housing bolts and are brought up tight to ensure the sealed tight embracement of the two half housings as to each other.

Upper half housing 40 is provided with a top opening in which an annular top bearing holder 50 is receivable, which holder supports a bearing 52.

An annular top bearing cap 54 seats on top bearing holder 50 and is secured thereto as by a plurality of spaced cap screws 56.

Lower half housing 42 is provided with a bottom opening in which an annular bottom bearing holder 60 is receivable, which holder supports a bearing 62.

An annular bottom bearing cap 64 seats on bottom bearing holder 60 and is secured thereto as by a plurality of spaced cap screws 66.

An annular elevator cover 64 is secured to lower half housing 42 as by cap screws 66 and encloses a bearing retainer ring 66 secured to bottom bearing holder 60 as by cap screw 70.

Bearings 52 and 62 support a vertically-extending main shaft 86 which will be provided at its upper extremity extending outwardly of the apparatus by a suitable drive means (not shown) for imparting a rotative force thereto in the usual manner.

As shown in FIG. 1, the main shaft has a center line L and the central portion or midsection thereof has an eccentric center line E with an eccentric distance and therebetween.

The central portion of main shaft 74 is sleeved with a main bearing 76 disposed between opposite thrust washers 78 at opposite upper and lower extremities thereof.

Each quadrant of the combined half housings is provided with a yoke-like connecting rod, the #1 connecting rod being best shown in FIG. 1 and numbered as 101 with its upper and lower arms 102 being provided with central openings to allow a sliding fit over main shaft 74.

The neck 103 of connecting rod 101 is provided with a vertically extending opening which is lined with a wrist pin bushing 106, which bushing mounts a wrist pin 108, which wrist pin supports a T-shaped cross head 110, the opposite arms 111 of which extend outwardly and are extendable through provided openings in respective opposite openings of the half housings and the head 113 of which extends outwardly in a plane normal to the two arms and extends through another opening in the half housings.

The outboard extremity of head 113 of the crosshead is extendable through a vertically-extending annular diaphragm plate 112 which is fixed to the cross head by a diaphragm retainer 114 secured by suitable cap screws 116.

A vertically-extending rubber diaphragm 120 circumscribes diaphragm plate 112 and is secured thereto as by cap screws 122.

The outer edges of the diaphragm are secured to screen basket top and bottom 20 and 24 respectively as by cap screws 124 and to the respective side of a vertically-disposed screen basket post 130 disposed between each quadrant of the half housings and adjacent the screen.

The aforedescribed subassembly comprised of similar connecting rods, cross heads and diaphragms, is found in each quadrant of the joined half housings.

The connecting rods of the other three quadrants will be seen in FIG. 1 with the respective arms thereof being identified as, in the case of #2 connecting rod, arms 202, in the case of #3 connecting rod, arms 302, and in the case of #4 connecting rod, arms 402.

The four screening diaphragms 120 are thus elastically mounted by means of the mounting of the arms of the respective connecting rods.

By virtue of the screening diaphragms 120 and posts 130 therebetween, there are defined a series of passageways 132 for the accepted stock fraction entering thereinto through screen 26.

The rejected fraction flows inwardly through inlet 13 of screen body inlet 12, fails of passage through screen 26 and continues circularly around the involute passage 12a defined between the body inlet wall and screen, finally passing outwardly of the apparatus through a rejected fraction outlet 12b.

The accepted fraction is passed from passage 12a through the screen into one of the passageways 132 and thence upwardly through opening 21 in screen basket top 20 and thence circularly around the involute passage 16a defined by top outlet 16, finally passing outwardly thereof through exit 17.

When the main shaft is set into rotation, the radially-extending connecting rods receive in seriatim the vibratory motion resultant from the eccentricity of the main shaft, which vibrations are reflected through the wrist pins and cross heads in the respective diaphragms imparting to each quick motions in both inboard and outboard directions.

The rotor is operated at high peripheral velocities, resulting in a tremendous number of relatively high intensity pulses, with a wide clearance between rotor and vertical screen without the danger of plugging, thereby minimizing the possibility of mechanical damage to the operating parts.

Unscreened stock flows between the screen and housing with accepted stock flowing through the screen.

The rejects are forced outwardly of the gutter by the combined forces, due to incoming unscreened stock and the pulsations of the diaphragms where they are bled from impingement on the screen exterior.

Provision for the addition of diluting water into the rejects trough is made to assure that in spite of the concentrating effect of the screen, the reject flow will not dewater.

I claim as my invention:

1. Apparatus for fractionating a fluid suspension comprising:

a circular housing having an inlet for introducing the fluid suspension to the inner side of the housing and a first rejects outlet and a second accepts outlet, a cover and a base for enclosing the housing at the top and bottom respectively, a circumferentially perforate cylindrical screen concentrically seated within the housing between the cover and base and having an outer screening side face and an inner accepts side face with the perforations adapted for accepting therethrough a fraction of the fluid suspension charged to the outer screening side face while rejecting another fraction of the fluid suspension, a first screening space bounded by the cover and base and inner side of the housing and outer screening side face of the screen defining a flow channel for the flow of the fluid suspension introduced thereto from the inlet communicating therewith for charging the fluid suspension to the outer screening side face of the screen.

a first rejects outlet fluidically connected to the first screening space for discharging the fraction of the suspension rejected by the screen, a second interior accepts screening space bounded by the cover and base and inner accepts side face of the screen defining a flow channel for the flow of the fraction of the suspension accepted through the screen, a second accepts outlet fluidically connected to the second accepts screening space for discharging the fraction of the suspension accepted through the screen, a rotatable drive shaft having a central axis disposed centrally through the housing and journalled relative to the cover and base with the portion of the drive shaft between the cover and base being eccentric to the central axis, a driving means connected to the drive shaft exteriorly of the housing for rotatably driving the drive shaft, a plurality of circularly-arranged diaphragms each elastically mounted relative to a section of the screen and being reciprocable with respect to the screen in pulsating to and from movements relative to the drive shaft, a plurality of connecting rods mounted relative to the eccentric portion of the drive shaft and each connected to a respective one of the diaphragms, the connecting rods being driven in to and fro movements in seriatim by the orbital movement of the eccentric portion of the drive shaft for creating the pulsations by the successive diaphragms relative to the screen.

2. Fractionating apparatus according to claim 1, wherein the diaphragms and screen are on generally vertical axes.

3. Fractionating apparatus according to claim 1, wherein the connecting rods connects the diaphragms to the eccentric portion of the drive shaft.

4. Fractionating apparatus according to claim 1, wherein the inlet is tangentially connected to the screening space.

5. A method for continuously screening a fibrous suspension into accepted and rejected fractions and for continuously cleansing the screening medium consisting of the steps:

introducing the suspension in a channel under pressure to a non-accept outer side of a slotted circular screen with an accepted fraction passing therethrough to a channel on the opposite accept side, pulsating the suspension by means of a plurality of circularly-arranged diaphragms each elastically mounted relative to a quadrant of the screen and reciprocable with respect to the screen in to and fro movements responsively to the eccentric rotative motions imparted thereto by the drive shaft and intermediate connecting rods so as to create a series of alternating compressions and decompressions for increasing the quantity of accepted suspension flowing through the screen and cleansing of the screen of the non-accepted fraction, leading the rejected fraction away from the screen to a rejected fraction outlet, and leading the accepted fraction away from the screen to an accepted fraction outlet.

* * * * *